April 14, 1953  
V. E. PALUMBO  
BEARINGS FOR SHAFTS OR SPINDLES EQUIPPED  
WITH RADIALLY SPACED OVERHANGING RACES  
Filed Dec. 30, 1949
2,635,018
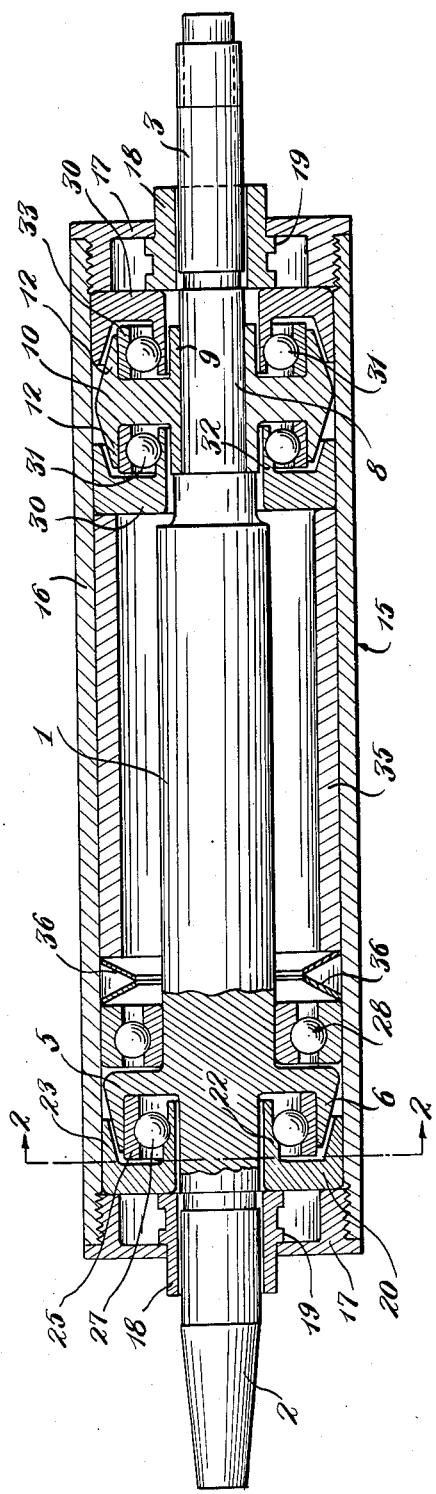
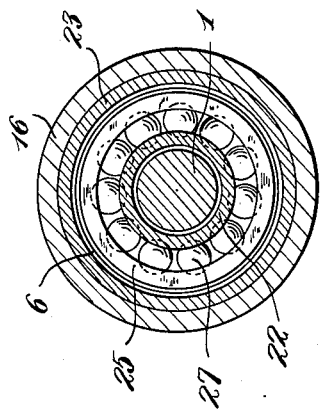
INVENTOR.
VINCENT E. PALUMBO
BY West Oldham
ATTORNEYS Patented Apr. 14, 1953

2,635,018

UNITED STATES PATENT OFFICE 2,635,018

BEARING FOR SHAFTS OR SPINDLES EQUIPPED WITH RADIALLY SPACED OVERHANGING RACES

Vincent E. Palumbo, Cleveland Heights, Ohio

Application December 30, 1949, Serial No. 135,992

7 Claims. (Cl. 308—174)

My invention is an improved bearing especially suited for incorporation in grinders, for supporting the spindles thereof. Accordingly, I have herein disclosed the invention in association with a grinding spindle and its housing. It will be understood, however, that the invention is of broader or more general application, for which reason the present disclosure should be taken as illustrative rather than as limiting.

An object of the invention is to provide a highly efficient and durable bearing that operates with the maximum of ease and wherein accuracy in the concentricity of the bearing parts or races with respect to the axis of the shaft or spindle is assured by the design and construction of the bearing.

Another object is to provide a bearing that is practically unaffected by heat generated therein during prolonged periods of use.

A further object is to provide a bearing wherein the parts are of simple construction, are economical of manufacture, and quick and convenient of assembly.

The foregoing objects and advantages, with others that will appear as this description proceeds, are attained in the embodiments of the invention illustrated in the accompanying drawing, wherein Fig. 1 represents a sectional side elevation of a grinding spindle and its housing, with the spindle rotatably supported within the housing by bearings of my invention, and Fig. 2 is a section on the line 2—2 of Fig. 1.

Referring to the parts by reference characters, I designates a shaft or spindle that has a tapered end 2 for the application of a grinding wheel or the like. On the opposite end 3 of the spindle may be mounted a pulley, for example, by which the spindle may be driven through the medium of a belt from an electric motor, all in accordance with common practice. Relatively near its tapered end, the spindle is provided with a collar 5, from the edge portion of which a flange 6 extends in an axial direction. To insure accuracy at the beginning as well as over long periods of service, I at present prefer to make the collar 5, with its flange 6, integral with the spindle, in which case the spindle may be forged and the parts thereof, requiring such finish, machined, it being especially essential that the inner surface of the flange 6 be concentric to the axis of the spindle.

Pressed, or otherwise suitably mounted upon a reduced portion 8 of the spindle a distance from its end 3 is the elongated hub 9 of a collar 10 from the edge portion of which extend, in opposite directions, flanges 12. A similarity will be recognized between the previously described collar with its flange 6, and each side of the collar 10 with its flange 12.

The spindle housing is designated, generally, by the reference numeral 15, and it comprises a cylindrical casing 16, into the ends of which are screwed annular caps 17 having apertures wherein are fitted the outer ends of thimbles 18 that loosely surround the spindle and have circumferential flanges 19, engaged by the caps, thereby to oppose any tendency for the thimbles to move outwardly. The inner ends of the caps and the corresponding ends of the thimbles are in the same plane and bear upon the web portions of annular channel members that constitute elements of the bearings. The annular channel member adjacent the tapered end of the shaft is designated 20. The opening in said member 20 is of somewhat greater diameter than the portion of the spindle that extends therethrough and the outer face of the inner flange of said member constitutes a bearing race which I have designated 22. The outer flange 23 of the channel extends along the inner surface of the casing 16 to provide proper support for the channel. For the sake of compactness, inasmuch as they overlap each other, the inner surface of the flange 23 and the outer surface of the flange 6 are reversely tapered. As a consequence, the external diameter of the annular channel member 20 is little greater than the maximum diameter of the collar 5. A grooved, cylindrical bearing race 25 is fitted within the flange 6, in opposed relation to the bearing race 22, and between them is a row or series of rotating bearing elements 27, shown as balls. The race 22 is also grooved, and is shown reduced in external diameter beyond the groove toward the edge of the flange or race. Obviously, in bearings of a size that will permit it, the race 22 may be made separate from and mounted upon the inner flange of the member 20. An anti-friction bearing 28, of conventional type, is interposed between the spindle and the casing 16 adjacent the side of the collar 5 remote from the member 20.

The bearing assembly just described possesses a characteristic present in the bearings shown in my Patent No. 2,481,146, dated September 6, 1949, and in Patents Nos. 2,488,825 and 2,488,929, granted to me on November 22, 1949, which makes the present bearing especially suited to the support of a grinding spindle. The characteristic referred to resides in the fact that the load is distributed substantially throughout the entire circumference of the bearing. One annular row or series of rotating bearing elements, as those designated 27 in the present case, sustain a vertical load, for example, throughout substantially the top half of the circumference of the bearing, and the other row or series of bearing elements, as those of the bearing 28, sustain said load practically throughout the bottom half. Remembering that in the use of a grinder, the work may be vigorously pressed against the periphery of the grinding wheel at various positions thereabout, it will be seen that a bearing of the kind described is especially efficacious.

Referring now to the other bearing assembly that is located adjacent the right hand end of the spindle, in Fig. 1, annular channel members 30 are associated with the collar 10 in like manner to the relationship of the corresponding parts in the first described assembly; and series or rows of rotating bearing elements 31 are disposed between the inner flanges or races 32 of said channel members and cylindrical races 33 that are applied to the inner sides of the flanges 12 of the collar 10.

The second described bearing assembly is held within the casing 16 between the inner end of the adjacent cap 17 and the opposed end of a tubular spacer 35 that occupies the central portion of said casing. Between the opposite end of said spacer and the first described bearing assembly are resilient washers 36, which are common in such constructions, and are intended to compensate for contraction and expansion of the bearing due to heat generated during prolonged use of the latter. This function of the washers 36 is of little consequence, however, in connection with my improved bearings, as they are practically unaffected by the generated heat, although these resilient washers do allow for slight irregularity in the dimensions of certain of the parts, as in the length of the spacer 35 and the depth of the caps 17, thus providing a limited range of tolerance which obviously is desirable in the matter of production.

It will be understood by those familiar with the art that the housing 15 may be clamped in the usual way in the stand or pedestal of conventional grinding equipment or like apparatus; and while I have shown my improved bearings associated with a grinding spindle, it is clear that the same is applicable to other kinds of apparatus for the support of shafts from any sort of journal boxes or housings, and regardless of whether the shaft or a surrounding structure which may be mounted thereon, rotates.

From the foregoing description it will be apparent that a principal distinction of my improved bearing resides in the radially spaced overhanging races of the shaft or spindle, provided by the collars 5 and 10 and their respective flanges 6 and 12, affording bearings for the shaft or spindle of relatively large circumference and consequential ease of operation.

Having thus described my invention, what I claim is:

1. In combination, a shaft, a collar provided with an elongated hub portion mounted upon the shaft and with oppositely extending flanges adjacent its periphery that are concentric to and spaced outwardly from the hub portion of the collar a substantial distance, and annular channel members surrounding the shaft with their inner flanges projecting axially over the ends of the hub portion of the collar and their outer flanges overhanging the flanges of the collar, the peripheral surface of the collar being tapered from the equatorial region thereof to the edges of the flanges of the collar, and the inner surfaces of the outer flanges of said member being flared complementary to the taper of said peripheral surface of the collar, and bearing means interposed between the inner flanges of the annular channel members and the flanges of the collar.

2. In combination, a spindle having provision for the attachment of a grinding wheel or the like to one end thereof, a bearing assembly comprising a collar extending radially from the spindle adjacent said end, the collar being provided at its periphery with an axially extending flange, an annular bearing member surrounding the shaft in slightly spaced relation thereto and having a flange spaced a substantial distance inwardly from the inner surface of the flange of said collar, bearing means interposed between said flanges, the diameter of said annular bearing member exceeding that of said collar, an annular bearing surrounding the spindle on the side of said collar remote from the annular bearing member, a second bearing assembly comprising a collar on the spindle adjacent the opposite end thereof extending radially from the spindle and provided adjacent its periphery with oppositely extending axial flanges, annular bearing members surrounding the shaft in slightly spaced relation thereto on each side of the last mentioned collar and having flanges extending toward said collar in inwardly spaced relation to the flanges of the latter, said annular bearing members being of substantially the same external diameter as the first mentioned annular bearing member, bearing means interposed between the flanges of said annular bearing members and the flanges of the collar, a cylindrical casing surrounding the spindle and fitting over the several annular bearing members, caps applied to the ends of said casing and bearing against the adjacent annular bearing members, and spacing means within the casing between and in engagement with said bearing assemblies.

3. In combination, a spindle having provision for the attachment of a grinding wheel or the like to one end thereof, a bearing assembly comprising a collar integral with the spindle and extending radially therefrom adjacent said end of the spindle, said collar being provided at its periphery with an integral axially extending flange, an annular channel member surrounding the shaft and having an inner flange spaced a substantial distance inwardly from the inner surface of the flange of said collar, bearing means interposed between said flanges, the outer flange of said annular channel member telescoping over the flange of the collar, an annular bearing surrounding the spindle on the side of said collar remote from the channel member, a second bearing assembly comprising a collar applied to the spindle adjacent the opposite end thereof and extending radially from the spindle and provided adjacent its periphery with oppositely extending axial flanges, annular channel members surrounding the shaft in slightly spaced relation thereto on each side of the last mentioned collar and having inner flanges extending toward said collar in inwardly spaced relation to the flanges of the collar, the outer flanges of said channel members telescoping over the last mentioned flanges, bearing means interposed between the inner flanges of said annular channel members and the flanges of the collar, a cylindrical casing surrounding the spindle and fitting over the outer flanges of the several annular channel members included in the two bearing assemblies, caps applied to the ends of said casing and bearing against the adjacent channel members, and spacing means within the casing between and in engagement with said bearing assemblies.

4. The combination defined by claim 2, wherein said spacing means includes a resilient element rendering said means variable in length.

5. In combination, a shaft, a housing encasing the shaft and having a cylindrical interior surface in radially spaced relation thereto, a cap applied to the end of the housing and having an aperture through which the shaft extends, a collar projecting radially from the shaft and provided adjacent its periphery with an axially extending flange closely adjacent the interior surface of the housing, an annular member fitted within the end of the housing and held therein by said cap, said member having a relatively short outer flange that extends along the interior of the housing and overlies the flange of the collar and a longer inner flange surrounding the shaft in closely spaced relation thereto and projecting in an axial direction into the enclosure of and in substantially spaced relation to said flange of the collar, bearing means interposed between and cooperating with the latter flange and the inner flange of said member, the outer flange of said member extending through the plane of said bearing means, and an anti-friction bearing operatively disposed between the shaft and housing on the side of said collar remote from said annular member.

6. In combination, a shaft, a housing encasing the shaft and having a cylindrical interior surface in radially spaced relation thereto, a cap applied to the end of the housing and having an aperture through which the shaft extends, a collar integral with and projecting radially from the shaft and provided adjacent its periphery with an integral axially extending flange closely adjacent the interior surface of the housing, the inner surface of said flange being in exact concentricity with the rotating axis of the shaft, an annular member fitted within the end of the housing and held therein by said cap, said member having a flange surrounding the shaft in closely spaced relation thereto and projecting in an axial direction into the enclosure of and in substantially spaced relation to the former flange, and bearing means interposed between and cooperating with said flanges.

7. In combination, a shaft, a housing enclosing the shaft and having a cylindrical interior surface in radially spaced relation to the shaft, closure means applied to the end of the housing and having an aperture through which the shaft extends, a collar surrounding and projecting radially from the shaft and provided adjacent its periphery with an integral axially extending flange closely adjacent the interior surface of the housing, the inner surface of said flange being in exact concentricity with the rotating axis of the shaft, an annular member fitted within the end of the housing intermediate the collar and said closure means, said member having a flange surrounding the shaft in radially spaced relation thereto and projecting in an axial direction into the enclosure of and in substantially spaced relation to the former flange, and bearing means interposed between and cooperating with said flanges.

VINCENT E. PALUMBO.

References Cited in the file of this patent

UNITED STATES PATENTS

| Number | Name | Date |
|---|---|---|
| 2,173,561 | Olson | Sept. 19, 1939 |
| 2,481,146 | Palumbo | Sept. 6, 1949 |
| 2,488,825 | Palumbo | Nov. 22, 1949 |
| 2,491,728 | Grafton | Dec. 20, 1949 |

FOREIGN PATENTS

| Number | Country | Date |
|---|---|---|
| 488,336 | France | June 21, 1918 |
| 582,661 | France | Dec. 24, 1924 |